Jan. 1, 1924

R. R. GRIFFITH

WHEEL

Filed June 4, 1921

1,479,066

2 Sheets-Sheet 1

INVENTOR:
R. R. GRIFFITH.
BY Whiteley and Ruckman
ATTORNEYS

Jan. 1, 1924.

R. R. GRIFFITH

WHEEL

Filed June 4, 1921

1,479,066

2 Sheets-Sheet 2

INVENTOR:
R. R. GRIFFITH
BY Whiteley and Ruckman
ATTORNEYS.

Patented Jan. 1, 1924.

1,479,066

UNITED STATES PATENT OFFICE.

RALPH R. GRIFFITH, OF MINNEAPOLIS, MINNESOTA.

WHEEL.

Application filed June 4, 1921. Serial No. 475,039.

*To all whom it may concern:*

Be it known that I, RALPH R. GRIFFITH, a citizen of the United States, residing at Minneapolis, in the county of Hennepin and State of Minnesota, have invented certain new and useful Improvements in Wheels, of which the following is a specification.

My invention relates to wheels, and has for an object to provide a rim and hub connected by separate sheet metal spoke elements which may be cut out of scrap sheet metal whereby the cost of production is greatly reduced.

The full objects and advantages of my invention will appear in connection with the detailed description, and the novel features embodied in my inventive idea will be particularly pointed out in the claim.

Figure 1:
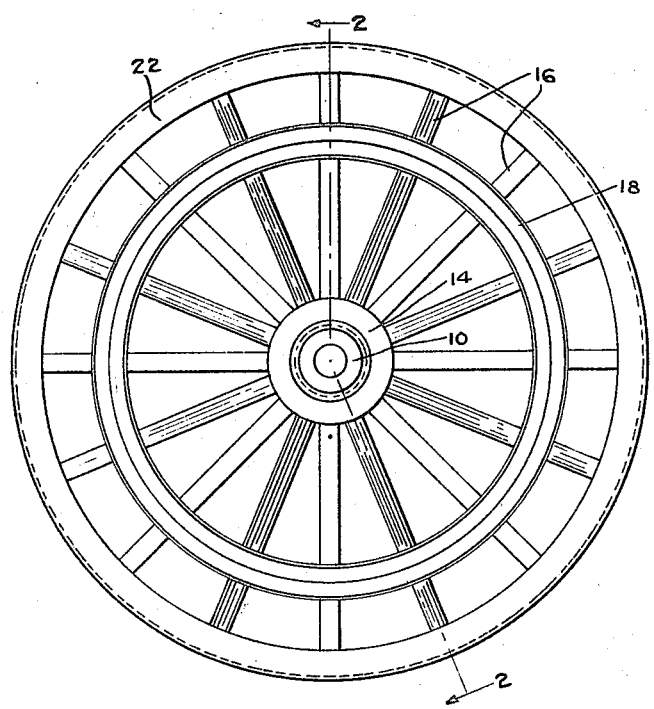
Figure 2:
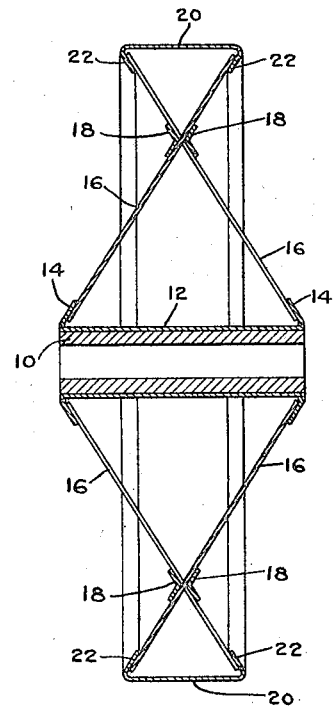
Figure 3:
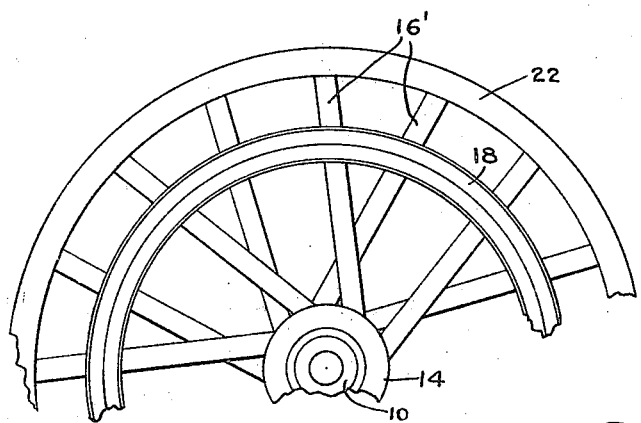
Figure 4:
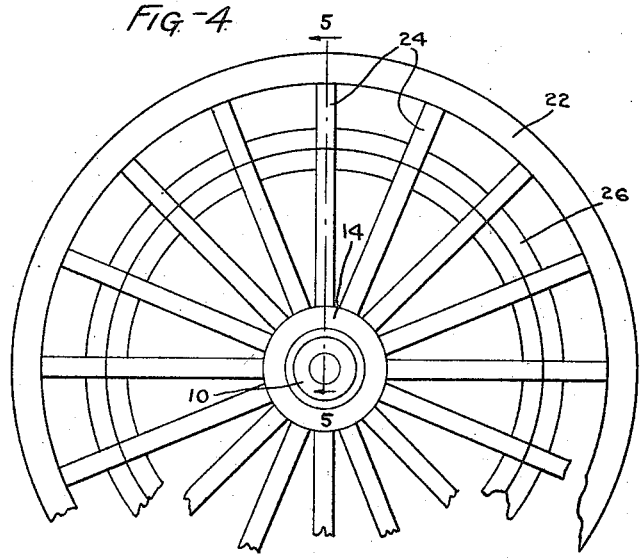
Figure 5:
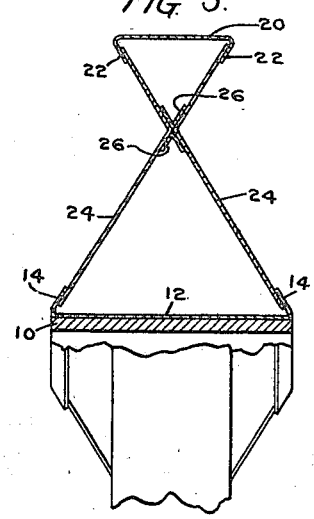
Figure 6:
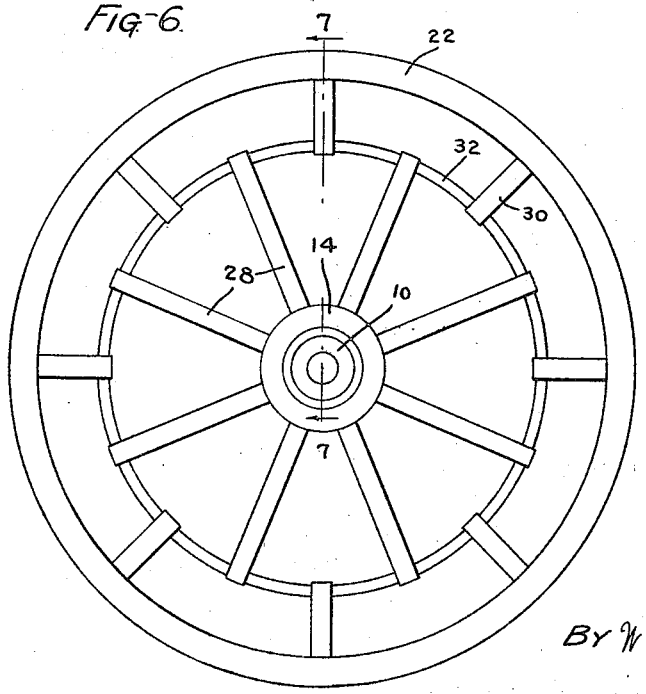
Figure 7:
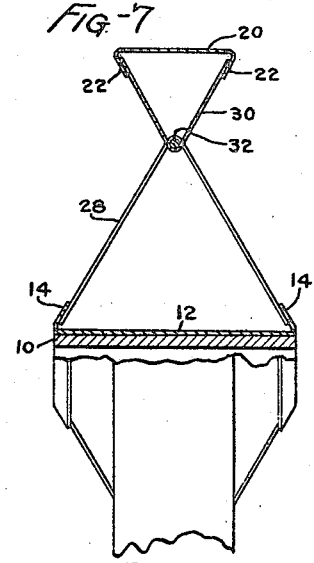

In the accompanying drawings which illustrate some of the different forms in which my invention may be embodied, Fig. 1 is a side elevational view of one form of my improved wheel. Fig. 2 is a view in section on the line 2—2 of Fig. 1. Fig. 3 is a fragmentary side elevational view of a slight modification. Fig. 4 is a side elevational view of another form of the invention. Fig. 5 is a view partly in section on the line 5—5 of Fig. 4. Fig. 6 is a side elevational view of another form of the invention. Fig. 7 is a view partly in section on the line 7—7 of Fig. 6.

In the construction of the improved wheel, I employ a hub 10 which is either cast or otherwise formed and a sleeve 12 is secured thereon in suitable manner, this sleeve being provided with outwardly extending flanges 14. I also employ a rim 20 provided with inwardly extending flanges 22. This rim may be rolled out of sheet metal and welded together in the usual way. The hub and rim are connected by spoke elements which may be cut from scrap sheet metal. In the form shown in Figs. 1 and 2, spokes 16 serving to connect the hub and rim are secured at their outer ends to the flanges 22 and at their inner ends to the flanges 14. As viewed in plan, these spokes appear to extend radially but viewed transversely as shown in Fig. 2, it will be seen that the spokes extend from the rim flanges to the hub flanges which are on the other side of the wheel. The spokes extend in alternation from the two sides of the rim to the opposite sides of the wheel at the hub so that as shown in Fig. 2 the spokes appear to cross but, of course, are in spaced relation to each other as shown in Fig. 1. In order to reinforce the spokes, a pair of annular angle bars 18 are secured thereto on opposite sides at the places where the spokes cross from one side of the wheel to the other. Each bar 18 will, therefore, be attached to the spokes in succession, first by one of its angle portions and then by the other of its angle portions and so on around the wheel. The angle bars and the ends of the spokes where they are attached to the rim and the hub are preferably secured by spot welding. The form shown in Fig. 3 is the same as that already described except that the spoke elements designated by the character 16' are secured at the hub in tangential relation thereto. In the form shown in Figs. 4 and 5, the spokes 24 instead of connecting from one side of the wheel to the other are bent back at an angle so that the ends of a spoke are secured to the hub and to the rim on the same side of the wheel. The spokes are reinforced by a pair of annular angle bars 26 secured thereto in suitable manner as by spot welding at the places where the spokes are bent back. These two angle bars are preferably attached in inward and outward relation to the spokes as shown in Fig. 5 instead of in sidewise relation thereto as in the form shown in Fig. 2. In the form shown in Figs. 6 and 7, the sheet metal strips which constitute the spokes do not extend integrally between the hub and the rim as in the other forms. Spoke elements 28 of V-shape have their two ends attached at opposite ends of the hub and spoke elements 30 also of V-shape have their two ends attached at opposite sides of the rim. As shown the elements 28 will preferably be longer than the elements 30 in the proportion that the hub is longer than the width of the rim, and these elements are preferably arranged in alternation with each other. In order to connect the hub and the rim by means of these spoke elements, an annular rod or bar 32 is secured to the spoke elements 28 and 30, this rod lying within the apexes of the spoke elements and being secured thereto in suitable manner as by spot welding.

The advantages of my invention are obvious. The wheel can be constructed at a very small cost and will have great strength and durability. It will be noted that in all of the forms of the invention shown the sheet metal spoke elements converge inwardly and outwardly from the rim and hub respectively toward a circle located between the rim and hub so that the wheel is perfectly trussed in all directions.

I claim:

A wheel comprising a rim having an inwardly extending flange at each of its sides, a cylindrical hub, a sleeve secured on said hub and having an outwardly extending flange at each of its ends, separate sheet metal spoke elements secured to said inwardly and outwardly extending flanges so as to converge inwardly and outwardly from said rim and sleeve respectively, toward a circle located between said rim and sleeve, and a circular reenforcing member secured to said spoke elements at the position of said circle, said re-enforcing member being so limited that portions thereof lie within and close to said circle.

In testimony whereof I hereunto affix my signature.

RALPH R. GRIFFITH.